July 26, 1949.                D. W. EPSTEIN                2,477,331
            IMAGE PROJECTION LENS AND MIRROR SYSTEM WITH
                    SPHERICAL ABERRATION CORRECTION MEANS
                         Filed Sept. 27, 1944
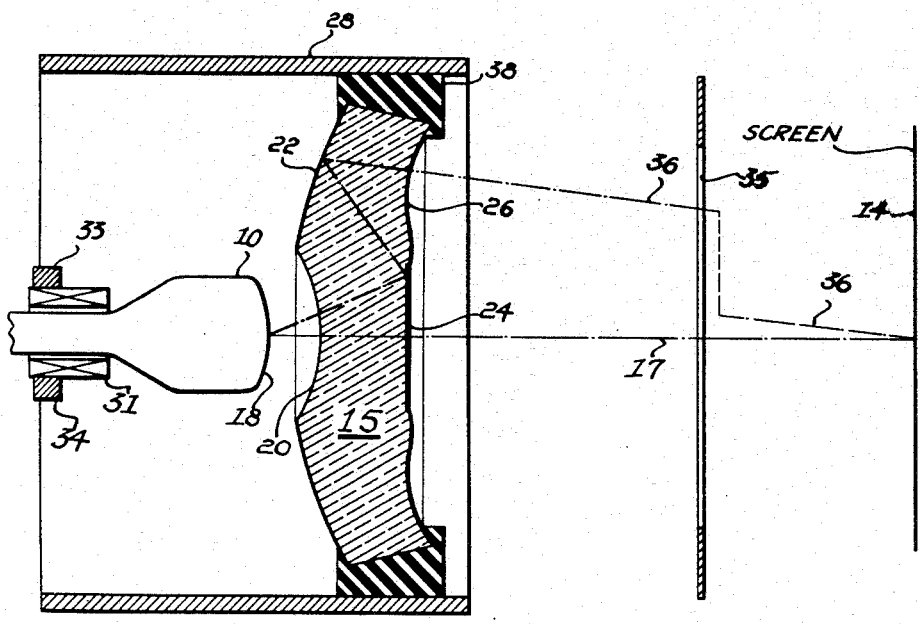
INVENTOR
DAVID W. EPSTEIN
BY
H. S. Grover.
ATTORNEY Patented July 26, 1949

SEARCH ROOM 2,477,331

UNITED STATES PATENT OFFICE 2,477,331

IMAGE PROJECTION LENS AND MIRROR SYSTEM WITH SPHERICAL ABERRATION CORRECTION MEANS

David W. Epstein, Princeton, N. J., assignor to Radio Corporation of America, a corporation of Delaware Application September 27, 1944, Serial No. 556,027

3 Claims. (Cl. 88—57)

The present invention relates to fast or wide aperture lens systems of high quality which comprise mirrors and correcting plates or lenses, and more particularly to novel combinations of such lens systems in television apparatus or the like.

In my Patent No. 2,295,779, granted September 15, 1942, I have disclosed and claimed a television image projector having in combination a television image producing tube, a spherical mirror, and a spherical aberration correcting plate. In this patented combination, the image producing tube is so disposed with respect to the other elements of the projection system that it and its associated ray deflecting parts and supporting means are readily accessible and do not diminish the available light reaching the viewing surface.

My present invention aims to improve the already compact optical system of the patent above referred to by making it still more compact. This is accomplished by combining optical elements of the patented system into a single unitary part which is itself capable of manufacture with comparative ease at low cost, and which simplifies the assembly of parts constituting the projector. In accordance with a preferred embodiment of the present invention, the optical system comprises a spherical mirror having a light transmitting portion surrounding the center thereof, a correcting means positioned in front of the spherical mirror to correct for spherical aberration, and a plane mirror located closely adjacent the correcting means with its reflecting surface facing the light transmitting portion of the spherical mirror whereby a cathode ray tube or other image-producing source may be positioned with its light-obstructing parts outside of the optical path which includes the spherical mirror.

In addition to the foregoing major aim or object of the invention, another and closely related object thereof is to provide a novel one piece optical member having combined functions.

Still another object is to provide a novel optical member which may be formed by a molding operation.

Other objects and advantages of the invention will, of course, become apparent and immediately suggest themselves to those skilled in the art to which the invention is directed from a reading of the following specification in connection with the accompanying drawing which shows one suitable form of television image projecting apparatus embodying the invention.

In the illustrative example, it is assumed that image signals are received from a suitable radio transmitter and then suitably amplified and demodulated in a suitable receiver, and that the resulting image signal is supplied through a video amplifier (not shown) to appropriately modulate the electron beam developed within a cathode ray tube 10.

With the tube 10 in operation, the reproduced image appearing on the end thereof is projected upon an image viewing surface, such as that provided by a screen 14, by means of the improved optical system provided by the unitary optical part or member 15.

The part or member 15 may be of glass selected in view of its optical characteristics, a plastic such as "Lucite" (methyl methacrylate), "Polystyrene," or other suitable transparent substance which may be cast, ground, molded under pressure, or otherwise suitably worked to provide the necessary configuration of its light reflecting and/or refracting surfaces. The centerline of the tube 10 is located on the line 17 which may be regarded as the optical axis of the projection system. The active face 18 of the tube 10 from which the luminous image is projected is opposite a depression 20 formed on one face of the member 15. The depression 20 provides a boundary surface between two optical media, in this case, between air and the material of the member 15. The remainder of this face is of spherical configuration so as to provide a spherical reflecting surface to serve as a spherical mirror 2.

The space between the tube face 18 and the area or depression 20 may, to advantage, be filled with a medium of approximately the same index of refraction as that of the tube 10 and the optical system 15, or the tube face 18 may fit perfectly into the area or depression 20 so that there is no air medium between them.

The central portion of the face of the member 15 opposite the mirror 22 is silvered or otherwise treated to serve as a plane reflecting surface or plane mirror 24. Surrounding this plane surface, designated as the mirror 24, is a boundary surface 26, formed or figured to serve as a spherical abberation correcting means or correcting plate. The function of the correcting plate in a television image projector is set forth in Patent No. 2,273,801, granted February 17, 1942, to D. O. Landis.

In the example illustrated, the optical system is mounted inside a cylindrical casing 28, which is or may be open at both ends. The deflecting yoke for the cathode ray tube is indicated at 31. Supporting means may be provided for the projection tube, the means being indicated at 33 and 34. These supports may be connected to the casing 28, which may, in turn, be removably supported or connected to an associated television receiver. With this arrangement of the parts, a compact unitary projector will be provided. The screen 14 may, if desired, be a separate element, such as any convenient surface adjacent the television receiver, or it may be formed by one of the exposed surfaces of the cabinet or housing for the associated television receiver. On the other hand, if desired, the supports 33 and 34 may be connected or secured to the casing of the associated television receiver. The member 15 is or may be firmly held in position in the casing 28 by a suitable retaining ring or gasket 38, formed preferably of a resilient material. It will, of course, be understood that the ring 38 may have frictional contact with a suitable part of the casing or cabinet of the associated television receiver, in which instance the casing 28 may be omitted.

The shape and relative size of the plane mirror 24 will depend upon the design of the particular projector. The relative dimensions of the mirror 24 are not critical and may be varied within reasonably wide limits. The location of the plane mirror with respect to other parts of the projection system will, of course, be determined by the dimensions and thickness of the member 15, and it may be situated anywhere between the spherical mirror 22 and its focus (at about one-half the center of curvature) so long as the cathode ray tube position is changed correspondingly. As a practical matter, the plane mirror should not be too close either to the spherical mirror or to its conjugate focus if maximum optical efficiency is desired.

The point of location of the cathode ray tube 10 may be at the principal focus of the curved mirror 22 as reflected to the rear of the projecting system by the plane mirror 24, taking into account the refractive effect at the boundary surface 20. The point of location of the cathode ray tube 10, however, usually is between the center of curvature of the spherical mirror and the principal focus when the optical system embodying the invention is used for projection work. The location of the virtual center of curvature after reflection will, of course, be determined by relative indices of refraction at the boundary surface 20. Light rays from the cathode ray tube 10, which serves as a source, and reflected from the mirror 22 near its edge are brought to focus on the screen 14 by reason of the presence of the correcting plate 26. The path of these rays after leaving the correcting plate is indicated by the line 36. An aperture, such as indicated at 35, located at the center of curvature of the mirror 22 will, in general, improve the operation of the optical system.

Various alterations may be made in the present invention without departing from the spirit and scope thereof, and it is desired that any and all such alterations be considered within the purview of the present invention as defined by the hereinafter appended claims.

Having now described the invention, what is claimed and desired to be secured by Letters Patent is the following:

1. An optical system comprising self-supporting optical member having a surface which is of a shape to provide a spherical mirror, a light transmitting portion in the center thereof to receive light from a luminous image source, another surface of said member which is of a shape to provide a plane mirror having its reflecting surface facing interiorly of said optical member toward said spherical mirror and located between said spherical mirror and a conjugate focus, and a further surface of said optical member which is of a shape to provide a spherical aberration correcting plate said last named surface surrounding said plane mirror.

2. An optical system comprising self-supporting optical member having a surface which is of a shape to provide a spherical mirror, a light transmitting portion in the center thereof to receive light from a luminous image source, another surface of said member which is of a shape to provide a plane mirror having its reflecting surface facing interiorly of said optical member toward said spherical mirror and located between said spherical mirror and a conjugate focus, and a further surface of said optical member which is of a shape to provide a spherical aberration correcting plate said last named surface lying approximately in the plane of said plane mirror.

3. In a projector for projecting luminous images comprising a luminous image source and an optical system, said optical system comprising a self-supporting optical device having a light transmitting surface facing the luminous image source, a surface of said device surrounding said light transmitting surface and being of a shape to provide a spherical mirror, another surface opposite the light transmitting surface being of a shape to provide a plane mirror to receive light from the luminous image, and a further surface of the device surrounding the plane mirror which is a shape to provide a spherical aberration correcting plate positioned to receive light from the spherical mirror.

DAVID W. EPSTEIN.

REFERENCES CITED

The following references are of record in the file of this patent:

UNITED STATES PATENTS

| Number | Name | Date |
|---|---|---|
| 929,795 | Siedentopp | Aug. 3, 1909 |
| 2,097,494 | Likotzky | Nov. 2, 1937 |
| 2,215,900 | Bitner | Sept. 24, 1940 |
| 2,295,779 | Epstein | Sept. 15, 1942 |
| 2,295,802 | Nicoll | Sept. 15, 1942 |
| 2,306,679 | Warmisham | Dec. 29, 1942 |
| 2,336,379 | Warmisham | Dec. 7, 1943 |
| 2,344,756 | Warmisham | Mar. 21, 1944 |